United States Patent [19]

Savage et al.

[11] 3,970,555
[45] July 20, 1976

[54] GAS REMOVAL FROM DEEP-BED FILTERS

[75] Inventors: Elton Stuart Savage, Wexford; Jeffrey J. Chen, Pittsburgh, both of Pa.

[73] Assignee: Dravo Corporation, Pittsburgh, Pa.

[22] Filed: Nov. 10, 1975

[21] Appl. No.: 630,346

Related U.S. Application Data

[63] Continuation-in-part of Ser. No. 584,945, June 9, 1975, abandoned, which is a continuation of Ser. No. 444,887, Feb. 22, 1974, abandoned.

[52] U.S. Cl. .................................. 210/80; 210/82; 210/274; 210/279
[51] Int. Cl.² .................. B01D 23/24; C02C 11/14
[58] Field of Search ............ 55/52, 62, 196; 210/80, 210/82, 195, 274, 275, 279, 291, 293, 202, 203, 11, 120, 218

[56] References Cited
UNITED STATES PATENTS

| | | | |
|---|---|---|---|
| 3,276,585 | 10/1966 | Kalinske | 210/80 |
| 3,306,447 | 2/1967 | Medeiros | 210/202 X |
| 3,441,503 | 4/1969 | Smith | 210/82 X |
| 3,709,364 | 1/1973 | Savage | 210/195 |
| 3,804,255 | 4/1974 | Speece | 210/221 X |
| 3,824,185 | 7/1974 | Caldwell et al. | 210/11 X |
| 3,829,377 | 8/1974 | Hashimoato | 210/11 |

*Primary Examiner*—Charles N. Hart
*Assistant Examiner*—Robert H. Spitzer
*Attorney, Agent, or Firm*—Parmelee, Miller, Welsh & Kratz

[57] ABSTRACT

Gas bubbles, and in particular nitrogen gas bubbles, generated during the denitrification of treated wastewater in a deep-bed filter are removed by venting them from a level below the surface of the filter bed. Gas removal may be enhanced by introducing pressurized air or water into the lower portion of the filter bed to dislodge the gas bubbles from the filter media and drive them upward where they can be vented to the atmosphere. Alternatively, pressurized air or water may be introduced into a vent pipe located below the surface of the filter bed to drive the gas bubbles up through the surface of the filter bed.

13 Claims, 3 Drawing Figures

GAS REMOVAL FROM DEEP-BED FILTERS

BACKGROUND OF THE INVENTION

1. Field of the Invention

This application is a continuation-in-part of application Ser. No. 584,945, filed June 9, 1975, now abandoned, which application is a continuation of application Ser. No. 444,887, filed Feb. 22, 1974, now abandoned.

This invention relates to the removal of gas bubbles from deep-bed filters and more particularly to the removal of nitrogen gas formed during the denitrification of wastewater carried out in deep-bed filters.

2. Prior Art

In the wastewater treatment system disclosed in the commonly owned U.S. Pat. No. 3,709,364, the nitrates and nitrites formed during the treatment process are converted to nitrogen gas by bacteriological action in a deep-bed filter. The nitrogen gas released into the effluent forms tiny bubbles which cling to or become trapped in the filter media. The presence of these nitrogen bubbles, though they enhance filtration efficiency, eventually build up to the point where they tend to blind the filter, thereby reducing efficiency of the filter. The escape of the nitrogen gas is retarded by the fact that clarification of the effluent is taking place concurrently and the particulate matter removed from suspension in the effluent also tends to clog or blind the filter. When the filter is operated down-flow, the heaviest concentration of these solids is found in the upper portion of the filter bed and conversely when the filter is operated up-flow.

It is common practice to purge filter beds used in wastewater treatment as well as those used for clarification of water supplies by backwashing. In backwashing, clean water is forced back upward through the filter bed to loosen the trapped solids and raise them to the surface where they can be removed. This requires the shut down of the filtering process and provision for an adequate supply of backwash water. Most installations employ two or more filter beds so that at least one can be kept in operation at all times. One method of speeding up the backwash cycle and reducing the amount of backwash water required is to introduce air into the bottom of the filter bed before backwashing to scour the filter media or to introduce air or water near the upper surface of the filter bed during backwashing to break up the heavy concentrations of trapped solids. It has also been proposed to continuously introduce air-saturated water into the effluent just above the upper surface of the filter bed during filtering to float the solids to the surface where they can be removed before they reach the filter.

All of the above means have been directed to removing the solids from the filter bed to either lengthen the useful life of the filter between backwashes or to shorten the backwash cycle. Especially in those installations where the filter is being used for denitrification as well as clarification and, therefore, nitrogen gas as well as the filtered solids combine to blind the filter, the need becomes great for an effective means to remove the nitrogen gas trapped in the filter bed in order to maintain filter efficiency. The prior art techniques are not effective in preventing this accumulation of gas bubbles in the filter bed and, therefore, require frequent shutdown of the filter for backwashing.

SUMMARY OF THE INVENTION

According to the invention, the nitrogen gas bubbles generated in a deep-bed filter through bacteriological action upon the nitrates and nitrites in the wastewater passed through the filter are removed by venting the gas from the filter bed. The vent means may take the form of an elongated hollow member having a number of apertures therein embedded in the upper portion of the filter media and a riser pipe connected to the hollow member for conducting the entrapped nitrogen gas to the atmosphere. Gas removal may be enhanced by injecting a fluid, such as air or water, under pressure into the lower portion of the filter bed to thereby dislodge or "bump" the gas bubbles loose from the filter media and drive them upward toward the vent means. This also helps to clear some of the solids trapped in the filter bed which improves the efficiency of the filter and lengthens the interval between backwashes. Alternatively, the pressurized water or air may be introduced into the upper portion of the filter during the filter process through the vent means to urge the gas bubbles upward through the upper surface of the filter bed. The invention embraces both the method and the apparatus for effecting gas removal from deep-bed filters.

DESCRIPTION OF THE PREFERRED EMBODIMENTS

Figure 1:
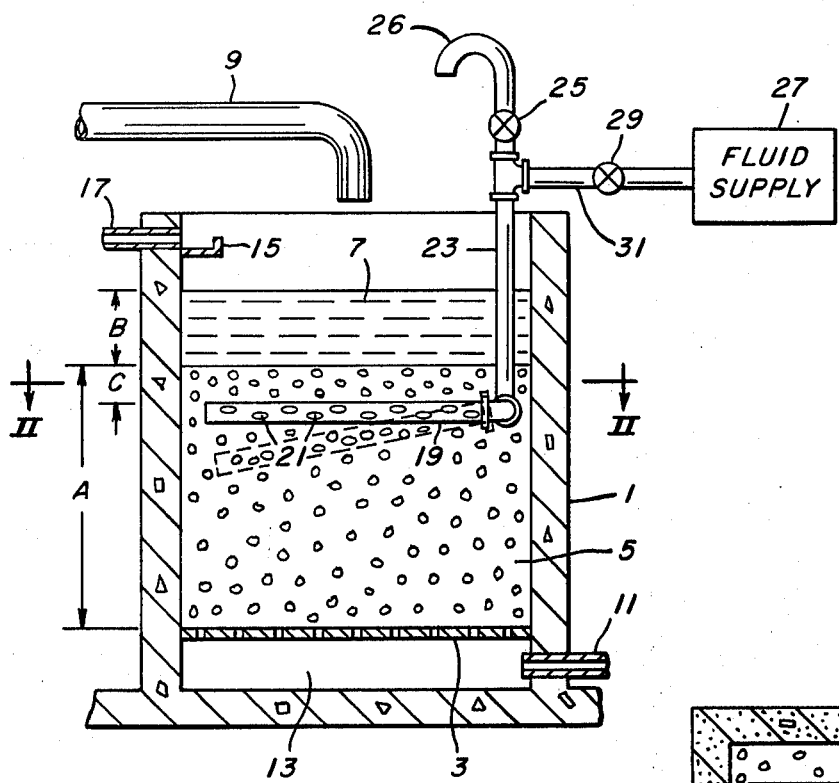
FIG. 1 is a vertical sectional view through a preferred deep-bed filter incorporating the invention.

As mentioned previously, the invention is particularly applicable, but not limited to, deep-bed filters in which denitrification and clarification of wastewater are carried out simultaneously. A typical deep-bed filter designed for down-flow operation is illustrated in FIG. 1 and includes a tank 1 generally constructed of concrete. The tank may be of any shape, rectangular or circular being the most common. The tank has an air-pervious reticulated false bottom 3 on which the filter media 5 is supported. The filter bed 5 is composed of any suitable filter media, such as, for example, gravel, anthracite, plastic spheres or particles and the like. A preferred filter media is a hard, rounded gravel-like coarse sand having a particle diameter in the range of from about 1 millimeter to about 6 millimeters. The depth A of the filter media may be typically between 3 and 20 feet depending upon the capacity of the installation.

Above the filter bed there is a head space 7 into which the partially treated liquid influent is conveyed through a pipe 9. In, for example, an activated sludge type sewage treatment plant, the filter influent is the effluent from the settling tank. The instantaneous depth of the head B will be a function of the capacity of the filter, the rate of the discharge of influent into the tank 1 through pipe 9 and the condition of the filter bed. The latter factor will be discussed below.

The filter is provided with an outlet pipe 11 leading from the space 13 below the false bottom 3. In normal operation, the effluent is preferably discharged into the top of the filter through the pipe 9 and flows downward through the filter media where the particulate matter, held in suspension, is removed. As described in the above-referenced U.S. Pat. No. 3,709,364, a colony of bacteria contained in the filter media converts the nitrates and nitrites in the treated sewage to nitrogen gas. The clarified and denitrified liquid then passes down through the false bottom 3 in the filter into the space 13 and out through the outlet pipe 11.

Although the filter is preferably operated down-flow, as illustrated, and preferably is capable of effecting denitrification concomitantly with the removal of suspended solids, it is to be realized that with minor modifications, the filter could just as well be operated up-flow. Moreover, as the invention resides in the provision of apparatus and method of removing entrapped gas bubbles from the filter media, it is to be further understood that the invention is applicable to any denitrification system wherein nitrogen bubbles are entrapped in the filter media and is not limited to only that embodiment wherein denitrification and suspended solids are concurrently effected.

After prolonged use, the solids removed by the filter from the influent tend to clog the filter and reduce its efficiency. The heaviest concentration of this particulate matter accumulates in the upper portions of the filter since this is the first area of the filter which is contacted by the influent. It is normal practice to remove these solids from the filter bed by periodic backwashing. The filter is backwashed by, for example, pumping clean water back into the outlet pipe 11 and up through the filter media. An overflow weir 15 along one wall near the top of the tank 1 directs the backwash water carrying the solids removed by it from the filter bed to a discharge pipe 17. This backwashed water may then be recycled back to the beginning of the treatment process.

The nitrogen gas generated during denitrification is released in the filter in the form of tiny bubbles. Although some of these bubbles rise and escape to the atmosphere through the upper surface of the filter bed, a great many become trapped in the interstices of the filter media. Excessive accumulation of these tiny bubbles of nitrogen in the filter media restricts the fluid flow through the filter bed and, therefore, reduces its efficiency. Depending upon whether the filter is operated up-flow or down-flow, the nitrogen gas bubbles, in addition to particulate matter either present in the influent or generated in the course of denitrification, tend to accumulate in that portion of the filter bed nearest the point of injection of the liquid being passed through the filter bed. Thus, in a down-flow operation, particulate matter and nitrogen bubbles tend to concentrate in the upper portion of the filter bed, whereas in an up-flow operation, particulate matter and nitrogen bubbles tend to concentrate in the lower portion of the filter bed.

Figure 2:
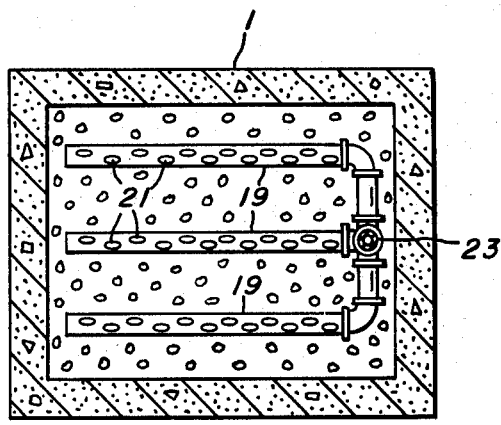
FIG. 2 is a plan view through the filter bed taken along the line II—II in FIG. 1.

In order to remove this trapped nitrogen gas and therefore increase the efficiency of the filter and prolong the intervals between backwashing, the nitrogen gas is vented to the atmosphere from below the surface of the filter bed. Venting is preferably effected by elongated hollow members 19 having a plurality of apertures 21 in the walls thereof connected to a riser pipe 23 which may be selectively opened to the atmosphere through a valve 25, the discharge end of the riser pipe being above the head of liquid passing through the bed. In accordance with the simplest embodiment of the invention, the venting of nitrogen gas bubbles is continuous, thus obviating the provision of the valve 25, the pipe 23 remaining open to the atmosphere at all times. As seen in FIG. 2, several elongated hollow members 19 may be connected to a common pipe 23. Of course, a multitude of arrangements of elongated hollow members and pipes can be adapted to suit a particular filter bed. The elongated hollow members may be laid out substantially horizontal to the upper surface of the filter bed, but preferably they are inclined slightly to the horizontal with the highest point connected to vertical pipe 23 to provide a route for the escape of the nitrogen gas bubbles. The apertures are preferably covered with screening to prevent clogging. It is to be further realized that the means by which the entrained nitrogen gas bubbles are vented from the filter bed is not limited to the employment of the elongated hollow members having apertures formed therein. The vent means may comprise, for example, suitable lengths of fritted glass or other porous material which would permit the nitrogen gas bubbles to escape from the filter bed to the atmosphere.

The depth C of the elongated hollow members 19 below the surface of the filter media and in the region of maximum gas accumulation which may vary depending upon such factors as the total depth A of the filter bed, the amount of particulate matter in the effluent, the amount of nitrates and nitrites and the flow rate through the filter, but are generally located within the space defined between the top 5 percent and the top 50 percent of the filter bed. For example, in a down-flow filter having a bed depth of about 10 feet, the elongated hollow members may be located between about 6 inches to 5 feet from the top surface of the filter bed.

Conversely, if the filter is operated up-flow, the elongated hollow members would be preferably located in the space defined between the bottom 5 percent and the bottom 50 percent of the filter bed. In the above example, the elongated hollow members would thus be located between about 5 feet to 9½ feet from the top surface of the filter bed.

Alternatively, on a continuous basis during filtering, or intermittently, a fluid, such as air or water, from a fluid supply 27 may be injected into the filter bed through pipe 23 and the elongated hollow members 19 by way of valve 29 and pipe 31. The injected fluid loosens the solids accumulating in the upper portion of the filter and "bumps" the trapped nitrogen gas bubbles in the upper portion of the filter bed, thereby freeing them to escape through the upper surface of the filter.

Figure 3:
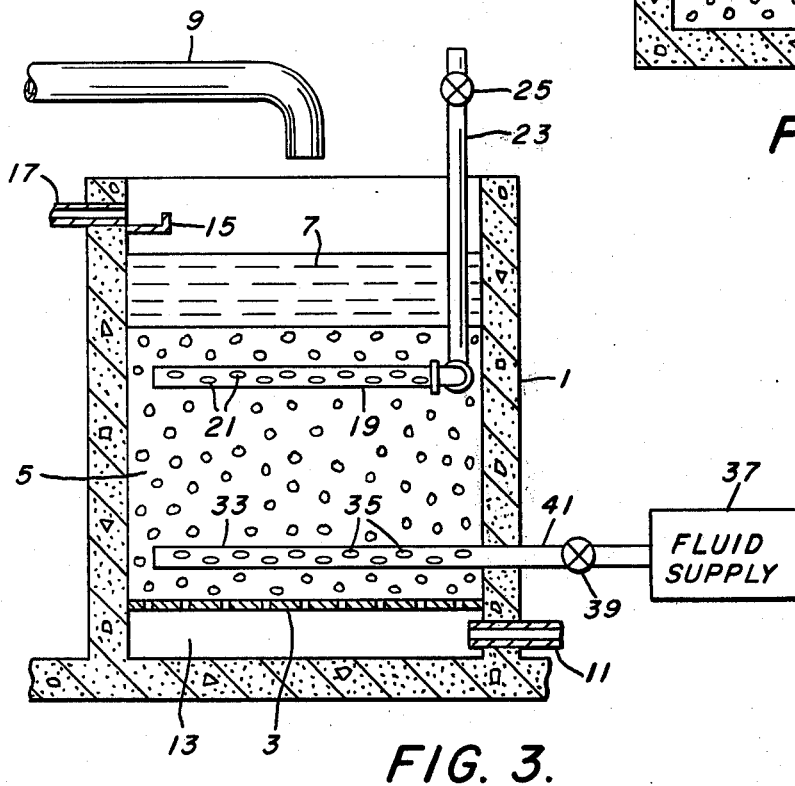
FIG. 3 is a vertical sectional view through a deep-bed filter illustrating another preferred embodiment of the invention.

FIG. 3 discloses a highly efficient arrangement for removing the nitrogen gas bubbles from the filter bed. Additional elongated hollow members 33, provided with numerous screened apertures 35, are embedded in the lower portion of the filter bed. A pressurized fluid, such as air or water, from a fluid source 37 is injected into the lower portion of the filter through valve 39, pipe 41, and the apertures 35 in the elongated members 33. The injected fluid then rises through the filter, bumping the bubbles of trapped nitrogen gas free throughout the filter media so that they may rise and be vented to the atmosphere through the vent comprising the elongated hollow members 19 and pipe 23. In this manner, the filter bed does not become blinded by the nitrogen gas released during denitrification of the partially treated sewage, and, as an added benefit, the interval between backwashes is extended since the injected fluid retards clogging of the filter by the suspended solids.

For example, about 66 gpm of clarified effluent from an activated sludge type sewage treatment system is passed through a deep-bed filter of the type illustrated in FIG. 1. The clarified effluent contains an average of about 16.6 mg/L $NO_3$—N and about 21 mg/L suspended solids, and is applied to the filter at an average rate of about 0.75 gpm/ft$^2$. The filter media 5 consists of hard-grained spherical sand having a particle size of between 3 to 6 mm and the depth A of the filter bed is about 6 feet. The depth C of the elongated members 19 below the surface of the filter bed 5 is about 1 foot. At the beginning of the filter run, the valve 25 is closed, thus allowing nitrogen gas bubbles to accumulate in the filter bed as denitrification progresses. As the filter run continues, the head B of water above the filter bed 5 rises due to both accumulation of suspended solids and entrainment of nitrogen bubbles in the filter bed. The head B is permitted to rise to about the point of maximum available head, i.e., that point where throughput is diminished and the filter would ordinarily be backwashed to restore it to optimum operating efficiency. In this case, the filter is normally backwashed when the head B reaches about 50 inches.

When the head B rises to the point where the filter would normally be backwashed, the valve 25 is opened, with the result that the accumulated head difference acts as a driving force to cause the entrapped gas to release from the filter media and be vented to the atmosphere through the elongated members 19, and riser pipe 23. Of course, due to the large head differential, a substantial quantity of water is initially driven out through the vent means along with the accumulated gas as an air lift effect is created upon opening of the valve. This initial spurt of water is redirected back to the filter through elbow 26 attached to the discharge end of riser pipe 23. (Alternatively, this water may be stored at that level in a container (not shown) and then discharged back to the elongated members 19 through riser pipe 23 just before valve 25 is closed, thus forcing more gas out of the filter). After the valve 25 had been open for about 30 minutes, the head B had dropped significantly due to the release of the entrapped gas bubbles.

Four such filter runs were made with the following results:

| Run | Head B, before venting, in. $H_2O$ | Head B, after 30 Mins. venting, in. $H_2O$ | $\Delta$B, in. $H_2O$ |
|---|---|---|---|
| 1 | 51 | 24 | 27 |
| 2 | 48 | 26 | 22 |
| 3 | 52 | 28 | 24 |
| 4 | 51.5 | 28.5 | 23 |

The above data clearly indicates that accumulation of nitrogen gas bubbles in the filter bed significantly contributes to the head build up in the filter with a corresponding decrease in filter efficiency. By venting the accumulated gas to the atmosphere in accordance with the invention, considerable operating capacity is restored to the filter, which would normally have been backwashed. Since, as before stated, backwashing necessitates taking the filter out of service, venting the gas bubbles from the filter while it is in operation significantly increases its service life.

Alternatively, the vent means may be opened to the atmosphere at all times to permit gas bubbles to escape from the filter media continuously as they are formed rather than periodically as described hereinabove. Continuous venting, of course, eliminates the initial surge of water through the vent means as there is no head differential between the water level B above the filter bed and the water level in the riser pipe 23. A comparison was made between a filter run wherein the gas bubbles were continuously vented to the atmosphere and a filter run where the gas bubbles were not vented. The nitrate and suspended solids content of the wastewater, the throughput rate and the length of filter run were identical in both cases. At the completion of the runs, it was observed that the head B in the filter run where the gas bubbles were not vented was about 28 inches greater than the head B in the filter run wherein the gas bubbles were continuously vented, thus again illustrating the deleterious effect of gas bubble accumulation and the advantage of increased service life afforded by the invention.

The venting of entrapped gas bubbles may, as said, be carried out intermittently as well as continuously. If operated intermittently, as the filter becomes blinded by gas bubble accumulation, the head of water B above the filter media increases, the head being permitted to rise to a predetermined level. When this level is reached, the release valve 25 is opened and the accumulated head difference acts as a driving force to force the gas from the filter media and drive the gas through the vent means. The venting may be performed manually or automatically. If the latter type of operation is desired, a sensing device (not shown) such as, for example, level sensing electrodes or float means may be employed to detect the head differential and when the head reaches its predetermined maximum, the sensing device operates an automatic release valve, such as a solenoid valve, on the vent pipe, thus releasing the entrapped gas. When the head returns to normal operating level, the valve would be automatically closed. It is to be understood that the bumping operation wherein a fluid is injected to aid in the release of entrapped nitrogen may also be operated automatically in a similar manner.

In summary, the efficiency of a deep-bed filter in which denitrification is carried out preferably concurrently with suspended solids removal, is greatly improved by venting the nitrogen gas formed during the denitrification process to the atmosphere to preclude blinding of the filter by trapped bubbles of nitrogen. Although venting alone, be it continuous or intermittent, may result in the removal of up to about 80 percent of entrapped nitrogen bubbles, the removal rate is enhanced if a fluid, such as air or water, is injected into the lower portion of the filter under pressure to loosen the bubbles of nitrogen and drive them toward the vent disposed in the filter bed.

Although the invention has been described by the foregoing with reference to the removal of entrapped nitrogen gas bubbles generated in the denitrification of nitrate laden wastewater, and in particular, sewage, it is to be understood that the invention is applicable to removing other gases which could become entrapped in a deep-bed filter system, such as, for example, air bubbles which are generated in an aerobic environment, methane or hydrogen sulphide generated in an anaerobic environment, carbon dioxide generated in a fermentation process, and the like.

What is claimed is:

1. In a deep-bed filter having influent means, effluent discharge means and a bed of filter media through which media liquids are passed and in the interstices of which media gas bubbles become entrapped, including improved means for removing said entrapped gas bubbles while the filter is in service, the gas removal means comprising:

an entrapped gas collecting means disposed within the filter bed, and located between the influent means and the effluent discharge means, at a level therein spaced from the influent end of the filter a distance, in the direction of fluid flow, of between about 5 to about 50 percent of the bed depth; and conduit means connected to the gas collecting means, said conduit means having a discharge end located at a height above the head of liquid passing through the bed to vent the entrapped gas bubbles to the atmosphere.

2. The apparatus of claim 1 including valve means associated with said conduit means to selectively open and close the discharge end of the conduit means to the atmosphere.

3. The apparatus as set forth in claim 1 wherein said gas collecting means comprises at least one elongated hollow member having a plurality of apertures through the walls thereof embedded in the filter media and said conduit comprises a riser pipe connected to the elongated hollow member and terminating externally of the filter bed to vent to the atmosphere the gas bubbles which enter the elongated hollow member through said apertures.

4. The apparatus as set forth in claim 3 wherein said elongated hollow member is inclined at an angle to the horizontal below the surface of the filter bed with the portion connected to the riser pipe being above the remainder of the elongated hollow member.

5. The apparatus as set forth in claim 3 including screening means covering the apertures in the elongated hollow member to preclude the apertures from becoming clogged.

6. The apparatus as set forth in claim 1 including means to introduce a pressurized fluid into the filter bed to dislodge the gas bubbles whereby they will be vented through the gas removal means.

7. The apparatus as set forth in claim 1 including means for introducing a pressurized fluid into the filter bed through the gas removal means to dislodge the gas bubbles and drive them up through the surface of the filter bed.

8. In a wastewater treatment process wherein wastewater is charged through an influent means to the influent end of a deep-bed filter containing a bed of filter media and discharged through an effluent means at the effluent end thereof and wherein gas bubbles become entrapped in the interstices of the filter media, a method of removing said entrapped gas bubbles, while the filter is in operation, comprising:

collecting said gas bubbles in an entrapped gas bubbles collection means disposed within the filter bed, between the influent means and the effluent means, at a level therein spaced from the influent end of the filter a distance, in the direction of wastewater flow, of between about 5 to about 50 percent of the bed depth; and venting said collected gas bubbles to the atmosphere through conduit means connected to the gas collecting means, said conduit means having a discharge end located at a height above the head of liquid passing through the bed.

9. The method of claim 8 wherein said entrapped gas bubbles are continuously vented to the atmosphere.

10. The method of claim 8 wherein said entrapped gas bubbles are periodically vented to the atmosphere.

11. The method of claim 10 wherein valve means associated with said conduit means are opened to periodically vent the entrapped gas bubbles to the atmosphere.

12. The method of claim 8 including the step of introducing a fluid under pressure into the filter bed.

13. The method of claim 12 wherein the fluid is air.

* * * * *